(12) United States Patent
Van Gael et al.

(10) Patent No.: US 8,364,612 B2
(45) Date of Patent: Jan. 29, 2013

(54) MACHINE LEARNING USING RELATIONAL DATABASES

(75) Inventors: Jurgen Anne Francios Marie Van Gael, Cambridge (GB); Ralf Herbrich, Cambridge (GB); Thore Graepel, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 603 days.

(21) Appl. No.: 12/559,921

(22) Filed: Sep. 15, 2009

(65) Prior Publication Data

US 2011/0066577 A1 Mar. 17, 2011

(51) Int. Cl.
*G06F 15/18* (2006.01)
(52) U.S. Cl. ........................................... 706/12
(58) Field of Classification Search .................. 706/12
See application file for complete search history.

(56) References Cited

U.S. PATENT DOCUMENTS

| | | | | |
|---|---|---|---|---|
| 5,701,400 | A * | 12/1997 | Amado | 706/45 |
| 6,581,058 | B1 | 6/2003 | Fayyad et al. | |
| 7,398,268 | B2 | 7/2008 | Kim et al. | |
| 2002/0103793 | A1* | 8/2002 | Koller et al. | 707/3 |
| 2005/0060191 | A1* | 3/2005 | Parkins et al. | 705/2 |
| 2009/0055364 | A1 | 2/2009 | Mandadi et al. | |
| 2009/0319458 | A1* | 12/2009 | Minka et al. | 706/46 |
| 2009/0325709 | A1* | 12/2009 | Shi | 463/42 |

OTHER PUBLICATIONS

Probabilistic Models for Relational Data David Heckerman, Christopher Meek, and Daphne Koller Microsoft Research and Stanford University heckerma@microsoft.com, meek@microsoft.com, koller@cs.stanford.edu Mar. 2004 Technical Report.*
Chung, Afzal, Hsiao, "A Software System Development for Probabilistic Relational Database Applications for Biomedical Informatics", retrieved on Aug. 7, 2009 at <<http://ieeexplore.ieee.org/stamp/stamp.jsp? tp=&arnumber=5136782&isnumber=5136572>>, IEEE Computer Society, International Conference on Advanced Information Networking and Applications Workshops, 2009, pp. 1002-1007.
Getoor, "Structure Discovery using Statistical Relational Learning", retrieved on Aug. 7, 2009 at <<ftp://ftp.research.microsoft.com/pub/debull/A03sept/getoor.ps>>, Bulletin of the IEEE Computer Society Technical Committee on Data Engineering, 2003, pp. 1-8.
Langkilde-Geary, "Declarative Syntactic Processing of Natural Language Using Concurrent Constraint Programming and Probabilistic Dependency Modeling", retrieved on Aug. 7, 2009 at <<http://www.mt-archive.info/MTS-2007-Langkilde-Geary.pdf>>, Proceedings of UCNLG, 2007, pp. 55-63.

(Continued)

*Primary Examiner* — Kakali Chaki
*Assistant Examiner* — Ababacar Seck
(74) *Attorney, Agent, or Firm* — Zete Law, P.L.L.C.; MacLane C. Key

(57) ABSTRACT

Machine learning using relational databases is described. In an embodiment a model of a probabilistic relational database is formed by augmenting relation schemas of a relational database with probabilistic attributes. In an example, the model comprises constraints introduced by linking the probabilistic attributes using factor statements. For example, a compiler translates the model into a factor graph data structure which may be passed to an inference engine to carry out machine learning. For example, this enables machine learning to be integrated with the data and it is not necessary to pre-process or reformat large scale data sets for a particular problem domain. In an embodiment a machine learning system for estimating skills of players in an online gaming environment is provided. In another example, a machine learning system for data mining of medical data is provided. In some examples, missing attribute values are filled using machine learning results.

16 Claims, 13 Drawing Sheets

OTHER PUBLICATIONS

Lunn, Thomas, Best, Spiegelhalter, "WinBUGS—A Bayesian modelling framework Concepts, structure, and extensibility", Statistics and Computing, vol. 10, 2000, pp. 325-337.

Sato, Kawashima, Kitagawa, "The Integration of Data Streams with Probabilities and Relational Database using Bayesian Networks", retrieved on Aug. 7, 2009 at <<http://ieeexplore.ieee.org/stamp/stamp.jsp? tp=&arnumber=4839091&isnumber=4839076>>, Proceedings of the 2008 Ninth International Conference on Mobile Data Management Workshops , 2008, pp. 114-121.

Singh, Mayfield, Shah, Prabhakar, Hambrusch, Neville, Cheng, "Database Support for Probabilistic Attributes and Tuples", retrieved on Aug. 7, 2009 at <<http://orion.cs.purdue.edu/docs/model.pdf>>, IEEE 24th International Conference on Data Engineering, 2008, pp. 1053-1061.

Singh, Mayfield, Mittal, Prabhakar, Hambrusch, Shah, "The Orion Uncertain Data Management System", retrieved on Aug. 7, 2009 at http://www.cse.iitb.acin/~comad/2008/PDFs/orion2-demo.pdf, Computer Society of India, International Conference on Management of Data (COMAD 2008), Dec. 17, 2008, pp. 1239-1242.

* cited by examiner

MACHINE LEARNING USING RELATIONAL DATABASES

COPYRIGHT NOTICE

A portion of the disclosure of this patent contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Machine learning systems are known which perform approximate inference using complex and large scale probabilistic models. For example, to learn features of sensor measurement data to be used in controlling communications networks, manufacturing systems, and other mechanical systems. Other applications including learning features of complex data such as image data for object recognition, image segmentation, intelligent image editing, medical image analysis and the like. Also, machine learning systems are known for learning or measuring the skill of players of online games, for predicting click events in the field of online advertising and for many other applications.

Many existing machine learning systems have been built by writing suitable bespoke software using conventional programming languages or other languages. The software has typically needed to be designed on a per-application basis to introduce appropriate variables for the problem domain, build suitable data structures and also to provide appropriate interfaces to receive data to be used for the machine learning. The true power of machine learning using probabilistic models comes into play when large scale data collections are used for learning. However, there is then a need to collect that data which may be at different sources, to format and preprocess it appropriately before use in the particular machine learning application. For large scale data sets this is a significant problem which is time consuming and complex to address. Once the data has been appropriately provided, and the probabilistic model formed, the machine learning process itself typically takes place using custom machine learning application software or commercially available software applications for performing inference.

More recently, software has become available which enables the probabilistic model and the learning process to be achieved as an integrated process. However, there is still a need to collect, pre-process and appropriately format the data required for the particular machine learning application.

The embodiments described below are not limited to implementations which solve any or all of the disadvantages of known machine learning systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Machine learning using relational databases is described. In an embodiment a model of a probabilistic relational database is formed by augmenting relation schemas of a relational database with probabilistic attributes. In an example, the model comprises constraints introduced by linking the probabilistic attributes using factor statements. For example, a compiler translates the model into a factor graph data structure which may be passed to an inference engine to carry out machine learning. For example, this enables machine learning to be integrated with the data and it is not necessary to pre-process or reformat large scale data sets for a particular problem domain. In an embodiment a machine learning system for estimating skills of players in an online gaming environment is provided. In another example, a machine learning system for data mining of medical data is provided. In some examples, missing attribute values are filled using machine learning results.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a machine learning system for data mining of medical data and/or estimating skills of game players, the system described is provided as an example and not a limitation. As those skilled in the art will appreciate, the present examples are suitable for application in a variety of different types of machine learning systems.

The term "factor graph data structure" is used herein to refer to a representation of the factors of a function. It is stored in memory and comprises nodes connected by edges, and where the nodes comprise at least some factor nodes which are computational units comprising instructions and at least some variable nodes which act as storage locations for variable values. The factor graph data structure may be bipartite although this is not essential. It may comprise only two types of node, factor nodes and computational units. However, this is not essential.

Figure 1:
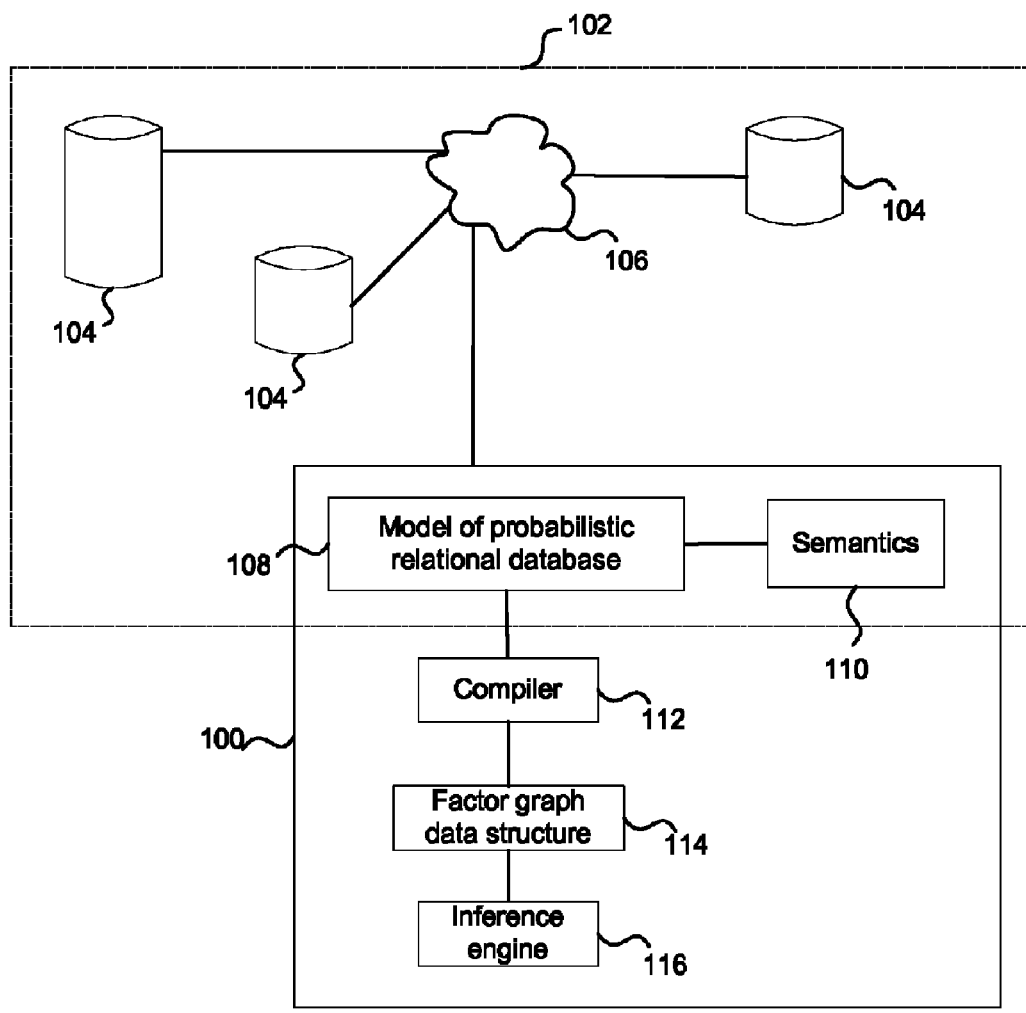
FIG. 1 is a schematic diagram of a machine learning system.

FIG. 1 is a schematic diagram of a machine learning system 100 connected to one or more relational databases 104. The relational databases 104 may be any existing relational databases storing deterministic data of any type such as medical data, sensor measurement data, manufacturing system data, communications network load data, game outcome data or other data. The relational databases 104 may be connected to the machine learning system directly or via a communications network 106 of any suitable type and the connections may be physical or wireless.

The machine learning system 100 is computer-implemented and comprises a model of one or more probabilistic relational databases 108 which may be stored in memory. The model is formed using a new programming language suitable for querying the relational databases 104 and which has semantics 110 comprising rules and/or instructions which may be stored in memory at the machine learning system 100. Together, the model of the probabilistic relational database 108, the semantics 110 indicating how to interpret the model, and the relational databases 104 may form a probabilistic relational database 102 as described in more detail below. The probabilistic relational database 102 may comprise data stored at relational databases 104 which may be stored on disc and/or in working memory according to the particular problem domain. The model of the probabilistic relational database may comprise a schema as described in more detail below which may be a description of a structure of a factor graph and which may be thought of as an interpretation of a probabilistic program. In some examples the schema may be stored in memory and the data on disc to enable large scale problem domains to be accommodated.

The machine learning system 100 also comprises a compiler 112 which is arranged to translate (using the semantics 110) the model of the probabilistic relational database 108 into a factor graph data structure 114 which may be stored in memory or at any suitable storage location. That factor graph data structure 114 may be provided as input to an inference engine 116 also provided at the machine learning system. Any suitable inference engine may be used which is able to perform message passing on the factor graph data structure 114 in order to carry out machine learning using the data from the relational databases 104. In some embodiments that inference engine is the infer.net (trade mark) tool which is currently publicly available as downloadable software from Microsoft Research (trade mark). Other inference engines may be used such as WinBUGS (trade mark) which is publicly available downloadable software. The WinBUGS tool is described in Lunn, D. J., Thomas, A., Best, N., and Spiegelhalter, D. (2000) WinBUGS—a Bayesian modelling framework: concepts, structure, and extensibility. Statistics and Computing, 10:325-337. Other tools are also available such as Alchemy (trade mark) by Stanley Kok et al of the Department of Computer Science and Engineering, University of Washington; PNTK by Kevin Murphy and Matt Dunham of UBC and others, downloadable software; and PNL software available from sourceforge.net (trade mark).

As mentioned above, the model of the probabilistic relational database 108 is formed using a novel programming language which comprises semantics 110 and example syntax as described herein. This programming language enables a probabilistic relational database 102 to be quickly and simply formed from existing relational databases 104 without the need to reformat data or preprocess data such that it meets particular requirements for machine learning. A model of the probabilistic relational database required is formed by writing a program in the novel programming language. The program is compiled by the compiler 112 to form a factor graph data structure 114. In this way the machine learning is integrated with the data. No "glue" code is required to interface with data as in previous approaches.

The novel programming language uses the concept of probabilistic attributes both in the definition of data schemas and in the process of formulating constraints among attributes and relations.

In an embodiment of the novel programming language, a relational model which may be a model of a probabilistic relational database 108 comprises a set of relation schemas which together form a relational database schema. Each relation schema (which can be thought of as a table) may comprise deterministic and probabilistic attributes. This is now explained in more detail.

A domain is a set of possible atomic values. For example, these atomic values may comprise data types such as integers, floating point numbers, strings.

A relation schema R, denoted by $R(A1,A2,\ldots,An)$ is made up of a relation name and a list of attributes. The degree of a relation schema is the number of attributes. Each attribute Ai is the name of a role played by some domain D in the relational schema R. The domain of Ai is referred to as dom(Ai). There are two types of attributes in a probabilistic database: deterministic attributes and probabilistic attributes.

A relation r of the relation schema $R(A1,A2,\ldots,An)$, also denoted by r(R), is a set of n-tuples where n is the degree of the relation schema. Each n-tuple is an ordered list $t=<v1,v2,\ldots,vn>$. Reference is made to the i'th element in the n-tuple as t[Ai]; the n-tuples may also be indexed with subsets: e.g. t[Ai,Aj,Al] is the 3 tuple corresponding to attributes Ai,Aj and Al. If Ai is a deterministic attribute, then vi is an element in dom(Ai). If Ai is a probabilistic attribute, then vi is a random variable over dom(Ai). It is not appropriate to think of the deterministic attributes as probabilistic attributes with a delta peak on one particular value for the following reason: the language allows t[Ai] where Ai is a deterministic attribute to get a special null value.

If the attributes of R are ordered to first give all d deterministic attributes and then p probabilistic attributes, then mathematically speaking, r(R) is a subset of the following Cartesian product:

$$r(R) \subseteq dom(A_1) \times \ldots \times dom(A_d) \times [U \to dom(A_{d+1})] \times \ldots \times [U \to dom(A_{d+1})]$$

Where U is some event space (Sigma algebra to be very precise). Each probabilistic attribute Ai indicates that the corresponding elements in the relation are random variables over dom(Ai).

A relation schema R may have a special set of attributes designated as the primary key; referred to by pkey(R). The primary key can only consist of deterministic attributes. When a relation R has a primary key pkey(R) then for each pair of n-tuples t,s in a relation r(R), the value t[pkey(R)] is different from the value s[pkey(R)].

A relational database schema S is a set of relation schemas S={R1,R2, . . . ,Rm}.

The novel programming language also provides relational algebra. This may be used to query data from a probabilistic database 102. The relational algebra is used to define factors (and so specify constraints) over the probabilistic database 102. These factors define a probability distribution over the probabilistic database. For example, the relational algebra comprises various operations, two of which, AUGMENT and FACTOR are now described in detail. For example, to build a probabilistic model random variables are introduced in the problem domain. After that, probabilistic dependencies (or constraints) are defined between those random variables. In order to achieve this the operations AUGMENT and FACTOR are used. AUGMENT takes an existing relation and adds a random variable; FACTOR uses relational algebra to introduce probabilistic dependencies between the variables The AUGMENT Operation The augment operation can be used on a set of tuples with only deterministic attributes to expand those with probabilistic attributes. For example \alpha<name><type>(R) will create a new relation where every tuple in R is now expanded with a random variable over the domain <type> which can be referred to with the identifier <name>.

The FACTOR Operation

The factor operation is used to select a subset of attributes from the n-tuples and maps them to a graphical model factor (that is, a factor node of a factor graph data structure). The following example generates a set of normal factors with mean 25.0 and standard deviation 1.0 on the skill of all players $\phi$Normal,[SKILL, 25.0, 1.0]$^{(PLAYERS)}$ More generally, the language denotes with $\phi$<factor name>, <factor expression list> (R) the factor of type <factor name> which is applied to each tuple in relation R (which is a general relational algebra expression). More specifically, the factor takes in arguments specified in the <factor expression list>. Each factor expression in this list could be an attribute (both probabilistic and deterministic) or a constant expression (scalar, vector).

If a program in the programming language described herein consists of a set of factor operations $\{\phi_1, \phi_2, \ldots, \phi_n\}$ targeting the relational database schema S then the probability distribution over the relational database can be formally written down as $$p(S) = \prod_{i=1}^{n} \prod_{f(args_i)=F} f(args_i)$$

Syntax

An example syntax of the novel programming language is now described. A program written using the novel programming language consists of four different sections. First a database is specified, then the schema of the relational database is augmented with random variables, then factors are added to the database to define a proper distribution over the database and finally a query may be performed.

Database Specification

A database can be specified with the following syntax
USE dbi
where dbi represents a database identifier.

Schema Augmentation

An augment clause may be used to add probabilistic attributes to a relation schema. For example, AUGMENT MedicalGender ADD Weight FLOAT, is an augment clause which adds a probabilistic attribute called Weight having a floating point number type, to a relation schema called MedicalGender.

Distribution Specification

Once the schema of the probabilistic database is defined, a probability distribution may be imposed by connecting probabilistic attributes by factors. The syntax for a factor is the following:

FACTOR fexpr FROM from_clause WHERE where_clause

The from_clause and where_clause may be as in a relational database query setting. The factor expression fexpr Is a specific description of a factor operating on a set of tuples implied by the from and where clauses. In other words, it specifies the functional form of the factors of the probability distribution over the relational database for the application concerned.

Figure 5:
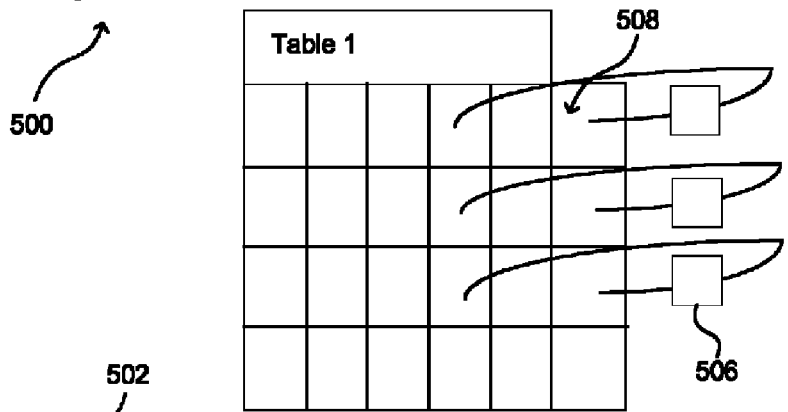
FIG. 5 is a schematic diagram of three factor types which may be used to connect probabilistic attributes in the machine learning system of FIG. 1.
Figure 5:
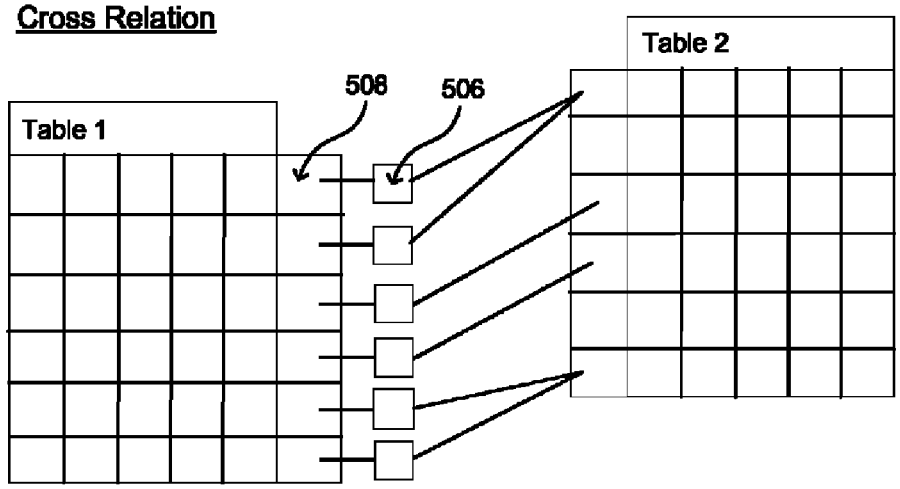
Figure 5:
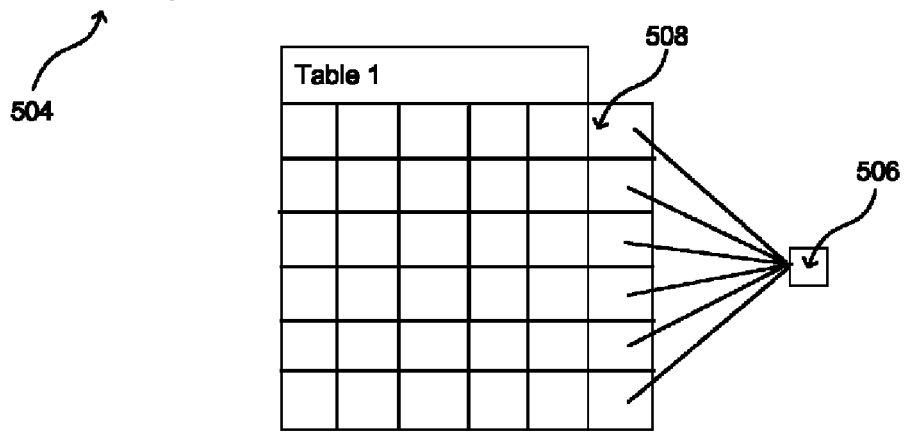

Various different types of factor expressions may be used and these can be classified in three basic factor expression types. Those three basic factor expression types are: single relation factors, cross relation factors and cross entity factors. These three factor expression types are illustrated in FIG. 5. A single relation factor is illustrated at 500 in FIG. 5 and links attributes in a single relation. A cross relation factor is illustrated at 502 in FIG. 5 and links probabilistic attributes between different relations. A cross entity factor is illustrated at 504 in FIG. 5 and links probabilistic attributes between tuples in a single relation.

Figure 2:
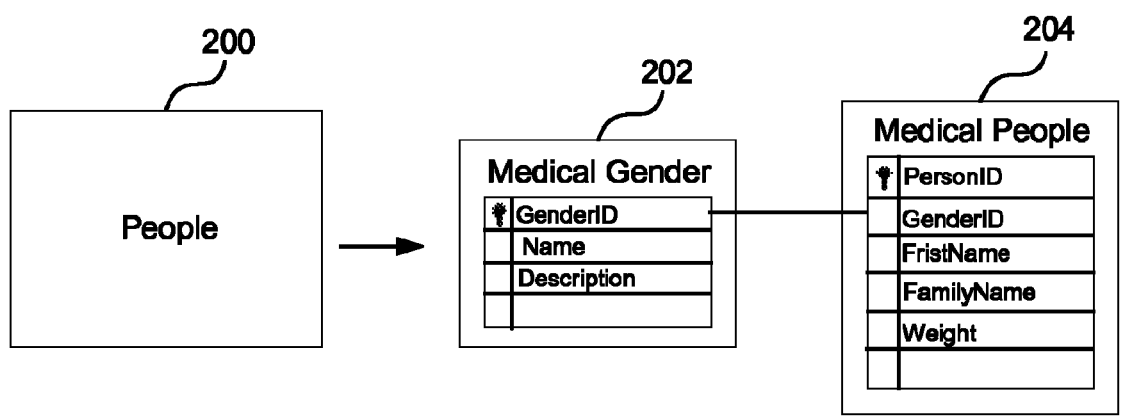
FIG. 2 is a flow diagram of a method of operating the system of FIG. 1 for data mining in a medical database.

A non-exhaustive list of examples of valid factor names comprises:
Equal
IsGreater
IsSmaller
Normal
Gamma
Discrete
Bernoulli
Multinomial
Dirichlet
Bernoulli
Poisson
Binomial FIG. 2 illustrates an example where the machine learning system of FIG. 1 is used for a data mining task in which it is required to estimate the weights of man and women in a population 200. An existing relational database is accessed. The existing relational database comprises a MedicalGender 202 relation schema having the deterministic attributes: GenderID, name and description. This is linked to a MedicalPeople table 204 (containing one record for each person in the population 200). The MedicalPeople table has the deterministic attributes: PersonID, GenderID, FirstName, FamilyName and Weight. It is required to find the weight of an average man from the population 200 or an average woman from the population 200.

Figure 3:
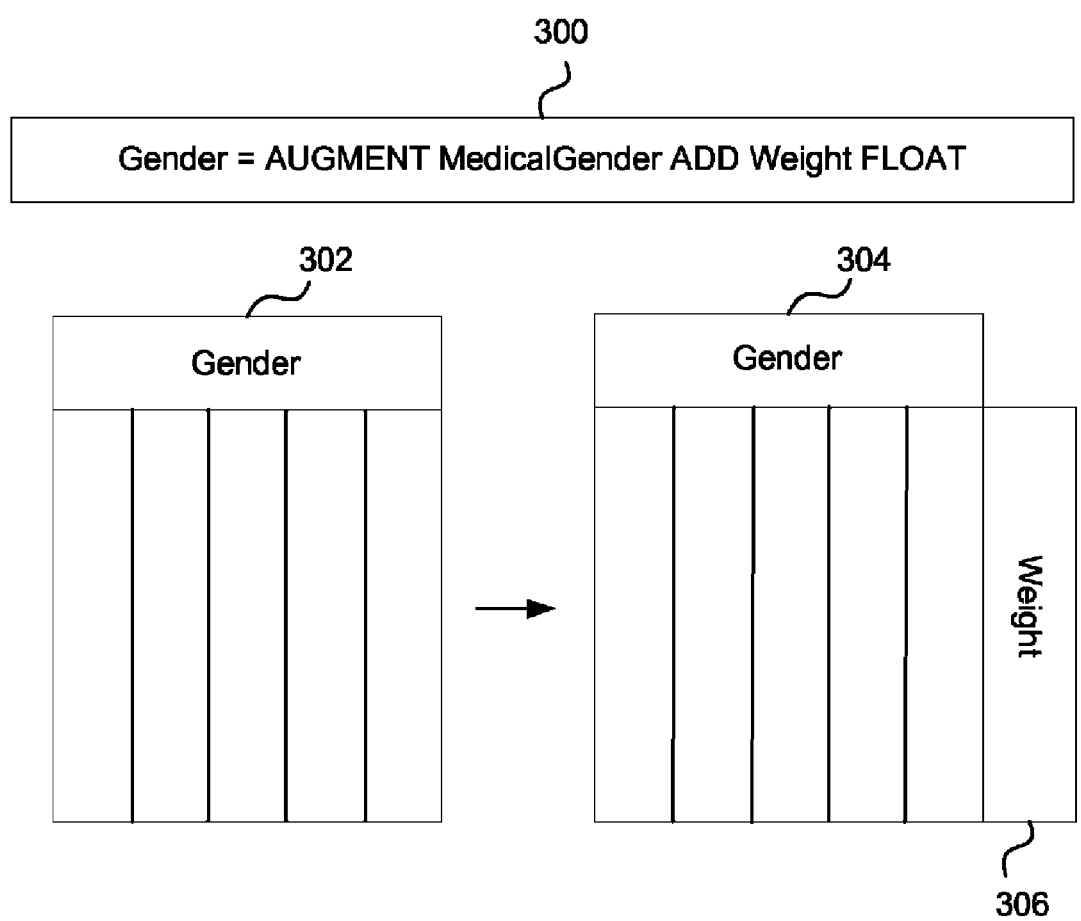
FIG. 3 is a flow diagram a method of augmenting a relational schema of an existing database to incorporate probabilistic attributes.

The existing relational database is modified by augmenting it with probabilistic attributes which are initially unknown. For example, as illustrated in FIG. 3 the model of the probabilistic relational database 108 comprises a program having an augment clause 300 such as:

GENDER=AUGMENT MedicalGender ADD Weight
FLOAT

This acts to create a new relation schema 302 from the MedicalGender table and adding a probabilistic attribute 306 called Weight which has a floating point number type, to create a new relation schema 304 called Gender. Thus the schema of the probabilistic database is defined in this example.

Figure 6:
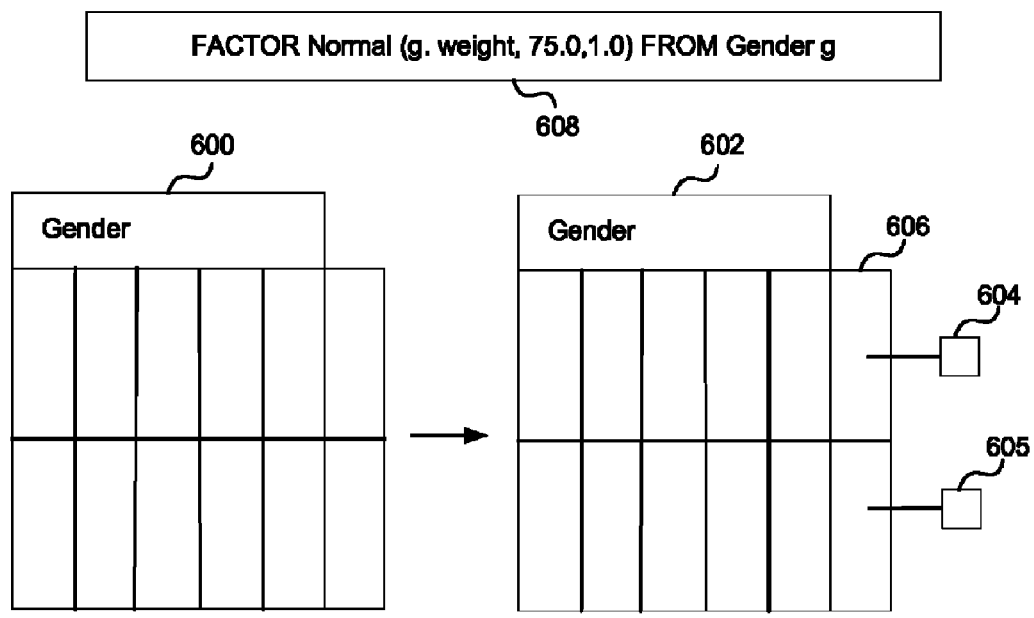
FIG. 6 is a schematic diagram of use of a single relation factor to form a probabilistic relational database.

A distribution is imposed by connecting the probabilistic attributes by factors as now described with reference to FIGS. 6 and 7. As shown in FIG. 6 a FACTOR expression is specified as follows:

FACTOR Normal(g.weight, 75.0, 1.0) FROM Gender
g

This single relation factor acts to link each probabilistic attribute of the Gender relation schema 260 to a factor node 604. Thus the weight for males links to factor node 604 for example and the weight for females links to factor node 605 for example. Factor node 605 comprises computational instructions which are specified using key word Normal with arguments g.weight, 75.0, 1.0 in this example. Factor node 604 represents computational instructions which are specified using key word Normal with arguments g.weight, 75.0, 1.0 in this example. The factor expression in this FACTOR statement specifies that the corresponding factor in the probability distribution over the relational database will be a function that takes the shape of a normal distribution over the variable g.weight with mean 75.0 and standard deviation 1.0.

Figure 7:
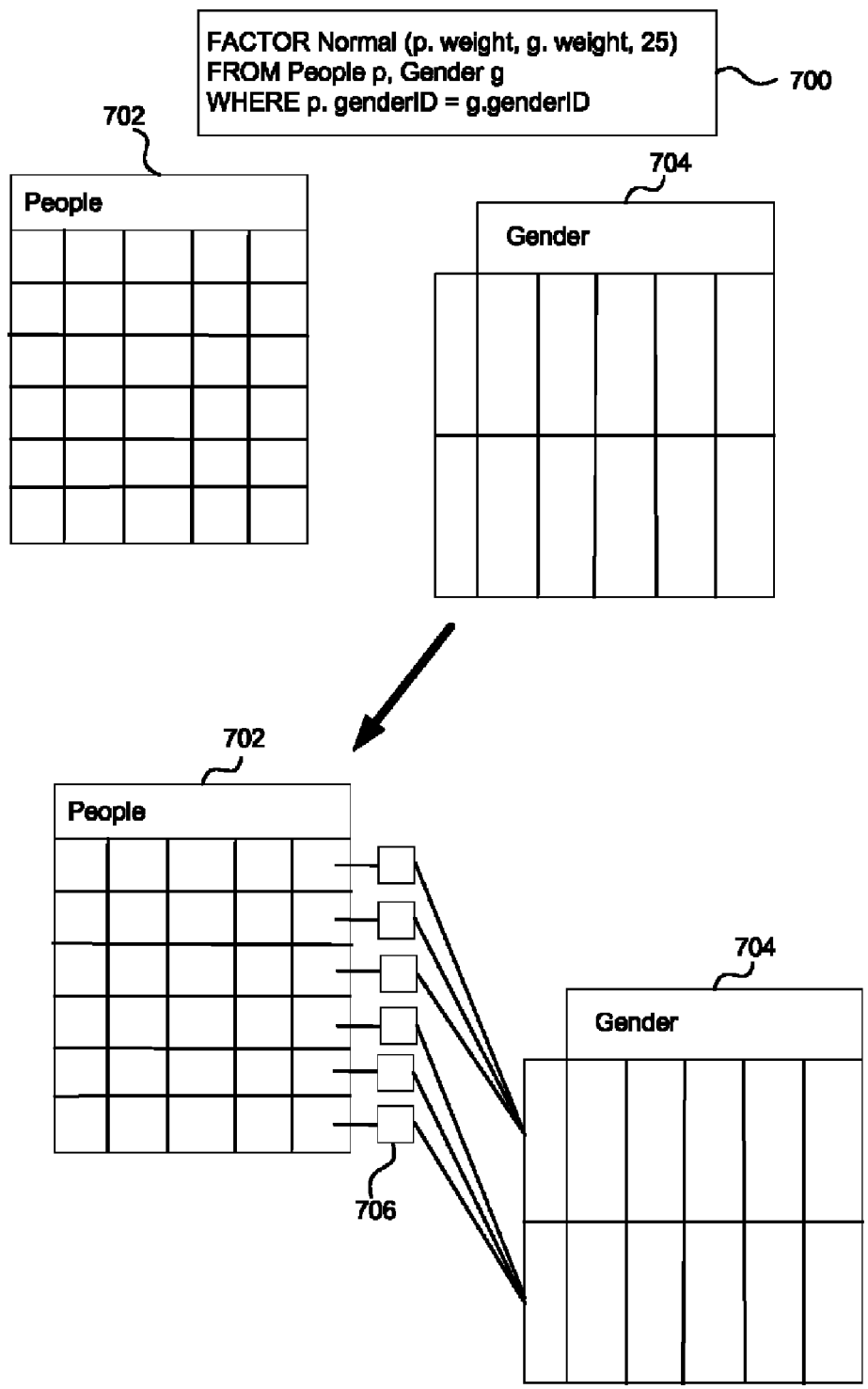
FIG. 7 is a schematic diagram of use of a cross relation factor to form a probabilistic relational database.

As illustrated in FIG. 7 a cross relation factor is also used. This factor (700 in FIG. 7) is for example:

FACTOR Normal(p.weight, g.weight, 25)
FROM MedicalPeople p, Gender g
WHERE p.genderID=g.genderID This acts to connect a factor node 706 from each person's record in a table named MedicalPeople 702 to either the female weight attribute of the Gender table or the male weight attribute of the Gender table 704. The factor node represents computational instructions specified by key word Normal with arguments p.weight, g.weight, 25 in this example. Here the factor expression in the FACTOR statement specifies that the corresponding factor in the probability distribution over the relational database will be a function that takes the shape of a normal distribution over the person's weight where the mean is the gender's weight and the variance is 25.

Figure 4:
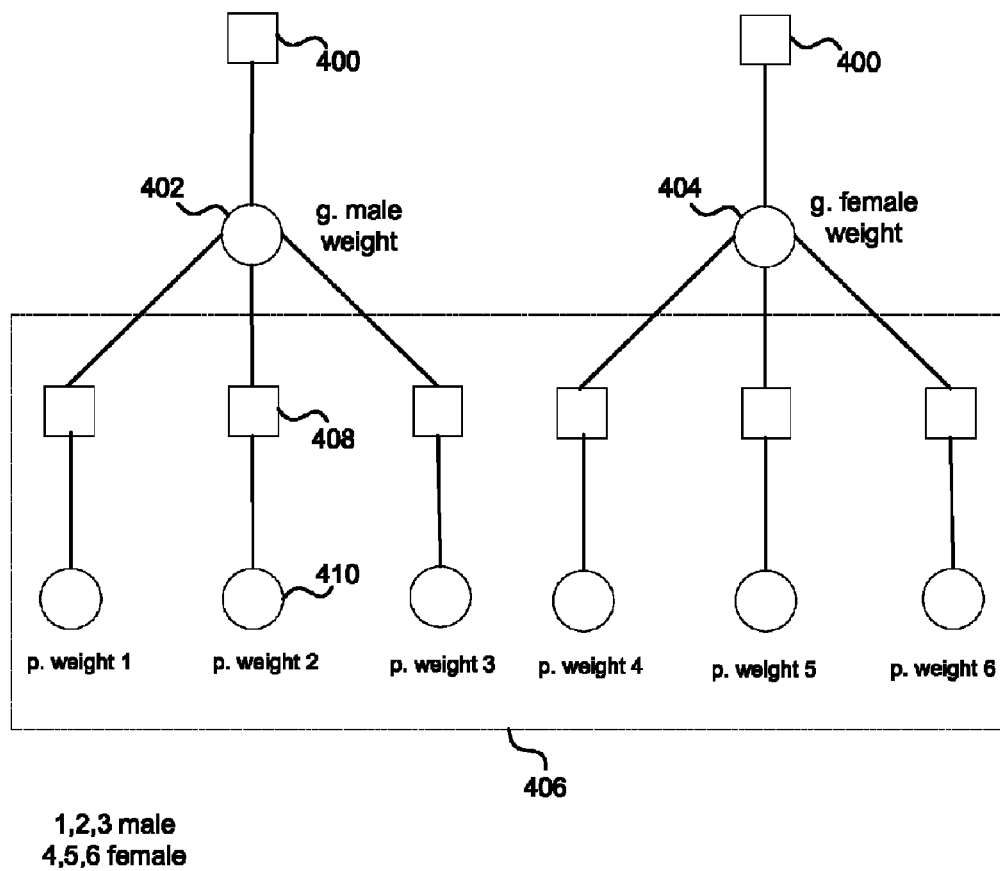
FIG. 4 is a schematic diagram of a factor graph formed as part of the method of FIG. 2.

The compiler 112 translates the relation schemas and factor statements into a factor graph data structure such as that illustrated in FIG. 4. The deterministic attributes which are weights of the individual people p.weight1 to 6 in this example, are represented at variable nodes 410. These variable nodes act as storage locations for floating point numbers which are the weights of the people in this example. Each variable node 410 is connected by a separate edge to a factor node 408. The factor nodes read and write information to their neighboring variable nodes according to calculation rules which are the instructions associated with the factor nodes. In this example, the factor nodes 408 read the variable values from variable nodes 410 to obtain the weights of each person. The factor nodes 408 are specified by the cross relation factors 706 of FIG. 7. The results of the computation are written to variable nodes 402 and 404. These are the probabilistic attributes 606 of the Gender table representing the average male weight 402 and the average female weight 404. The variable nodes 402, 404 are linked to factor nodes 400 as a result of the single relation factor specified in FIG. 6 so that these factor nodes 400 correspond to factor nodes 604, 605 of FIG. 6. The part of the factor graph data structure enclosed in dotted lines 406 in FIG. 4 represents the likelihood and the remaining part the prior distribution in a Bayesian inference model. The factor graph data structure may then be provided to an inference engine as described above to carry out inference. Data from the medical database is read and used to repeatedly update the probabilistic attribute values 402, 404 of FIG. 4. In this way the data mining task is completed by reading values stored at the variable nodes 402, 404.

Figure 8:
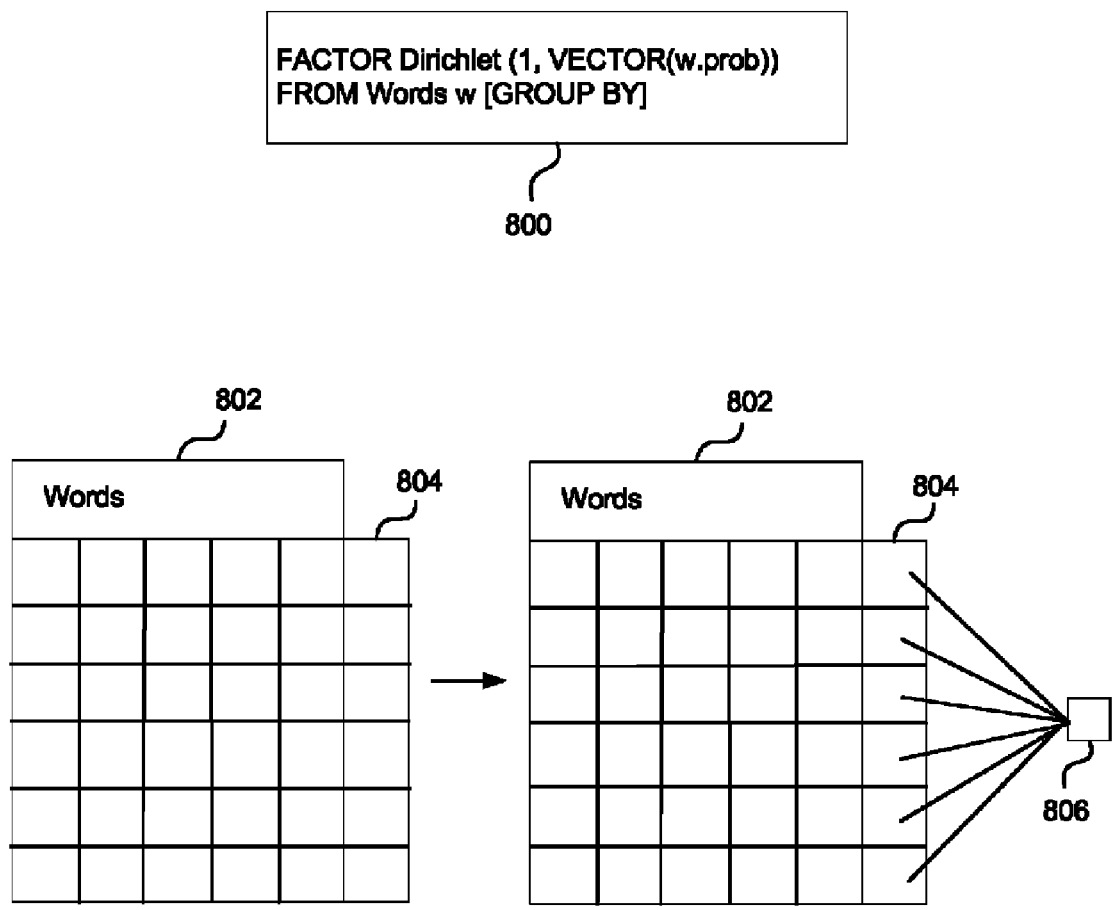
FIG. 8 is a schematic diagram of use of a cross entity factor to form a probabilistic relational database.

An example of use of a cross entity factor is given with reference to FIG. 8. In this model, the task is to learn a language model. This is a task of great importance for various natural language processing applications such as speech recognition and machine translation. An aim is to learn the probabilities of each word in a particular corpus. Starting with a relational database comprising a relation schema called Words containing the vocabulary of a corpus. This relation 802 is augmented by probabilistic attributes 804 using the statement "AUGMENT Words ADD prob FLOAT" This new variable will denote the probability of observing a particular word. Factor statement 800 is used to link a factor node 806 to each of the entities (rows) of the Words table 802. The Dirichlet factor 800 will constrain all the word probabilities to sum up to one. Finally, the words in the database are connected with the distribution over words using the following statement "FACTOR Discrete(sw.word_id, VECTOR (w.word_id), VECTOR(w.prob))

FROM Words w, StoryWords sw GROUP BY sw.story_id, sw.word_id". This FACTOR statement connects all the observed words in the corpus (StoryWords) with the probability distribution over the vocabulary.

Figure 9:
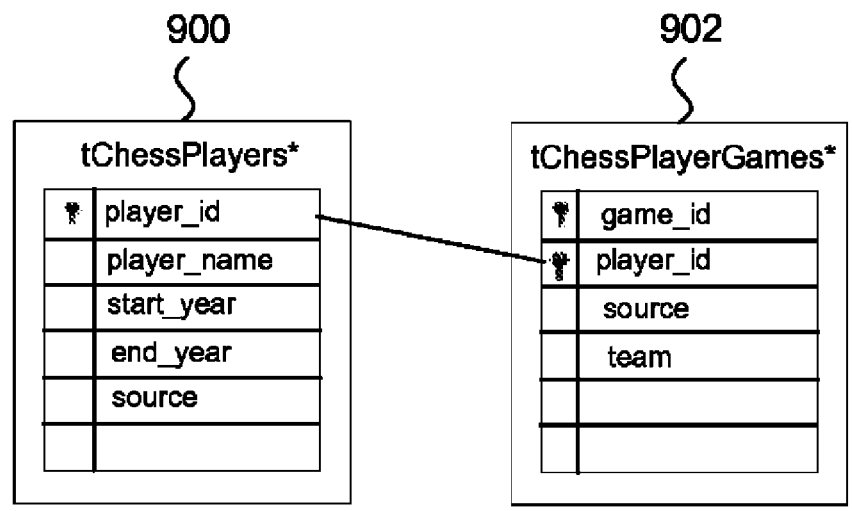
FIG. 9 is a schematic diagram of a relation schema for a machine learning system arranged to learn the skill of players of a game.

In an embodiment of the machine learning system of FIG. 1 the relational database comprises information about game players and game outcomes. The data mining task is to estimate the skill of players in an online gaming setting. The probabilistic attributes are skills of the players which are learnt by the machine learning system as games are observed. For example, the relational database comprises two relation schemas illustrated in FIG. 9 as tables 900, 902. Table 900 tChessPlayers comprises information about a player and many such tables may be provided, one for each player. Table 902 tChessPlayerGames comprises information on each game played by a player. A player's record in the tChess-Player table may link to a plurality of records in the tChess-PlayerGames table, one for each game the particular player has participated in.

The tChessPlayers table is augmented with a probabilistic attribute representing the skill of that player. For example, an augment statement is provided as follows:

Players=AUGMENT tChessPlayers ADD skill FLOAT;

In addition, the tChessPlayerGames table is augmented with a probabilistic attribute representing the performance of that player in a particular game. This may be achieved using an augment statement as follows:

PlayerGames=AUGMENT tChessPlayerGames ADD performance FLOAT;

Constraints are then specified by using factor statements. For example, the factor statements given below are used.

FACTOR NormalMP(p.skill, 25.0, 0.05) FROM Players p

This factor statement is a single relation factor which establishes factor nodes 1000 connected to the probabilistic skill attributes in the tchessPlayers tables. It can be thought of as inserting a prior to each player's skill.

FACTOR NormalMP(pg.performance, p.skill, 0.1) FROM PlayerGames pg, Players p
WHERE pg.player_id=p.player_id;

This is a cross relation factor which connects the player skills to the player performances.

FACTOR IsGreater(pgb.performance, pga.performance+0.1)
FROM PlayerGames pga, PlayerGames pgb
WHERE pga.game_id=pgb.game_id AND pga.player_id<pgb.player_id AND pga.score=0;
FACTOR IsGreater(pga.performance, pgb.performance+0.1)
FROM PlayerGames pga, PlayerGames pgb
WHERE pga.game_id=pgb.game_id AND pga.player_id<pgb.player_id AND pga.score=2;

These last two factor statements connect two players performances depending on the game outcome.

Figure 10:
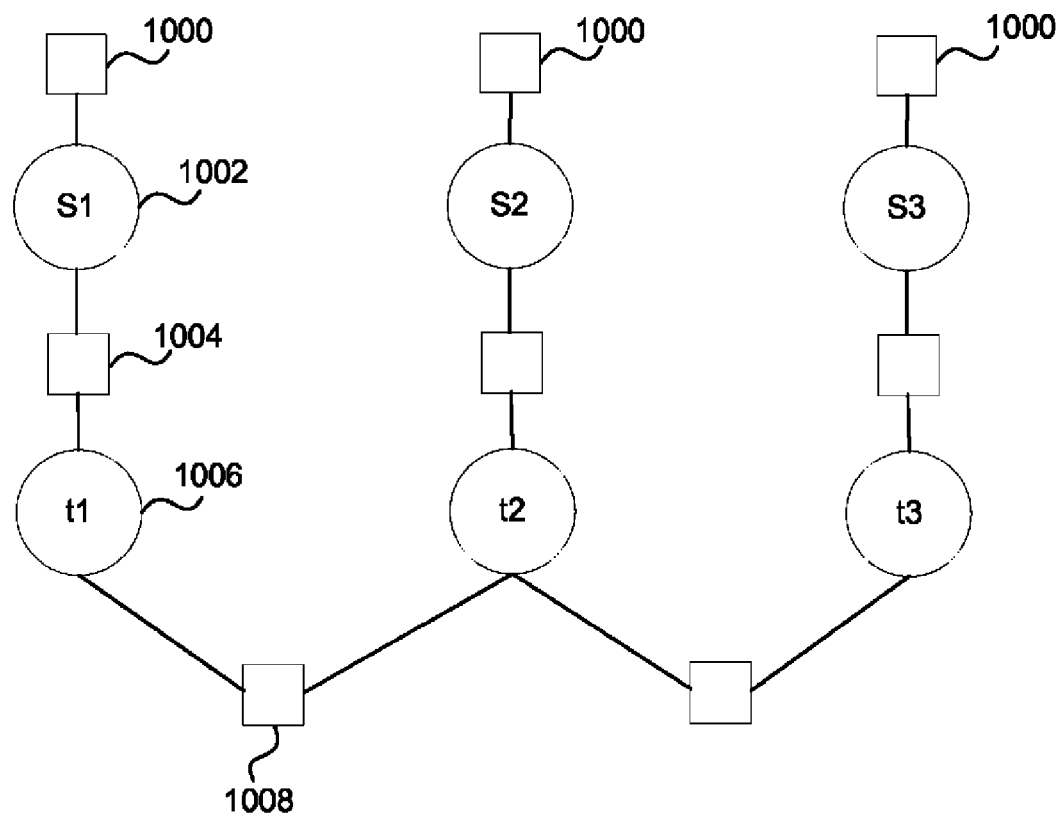
FIG. 10 is an example factor graph produced by a machine learning system arranged to learn the skill of players of a game.

The compiler translates the probabilistic relational database model into a factor graph data structure such as that of FIG. 10. The single relation factor statement gives rise to the factor nodes 1000 which read in player skill variables with one of these factor nodes 1000 for each player. The factor nodes 1000 write the player skill variables into variable nodes 1002 S1 to S3 (there are three players in this example). For new players the variable values are initialized to default values and for existing players for whom machine learning has already taken place, the variable values are read from the database.

The first cross relation factor provides factor nodes 1004 which connect the skill variable nodes 1002 to the player performance variable nodes 1006 (t1 to t3 in the example). These factor nodes 1004 can be thought of as adding noise to the player skill variables and writing the result to the player performance variable nodes t1 to t3. A game outcome is observed for a game in which players 1 to 3 participate and in this example, player 1 is the winner, player 2 is in second place and player three is last. That is, the nodes of the factor graph are ordered on the basis of the game outcome. This ordering and the provision of factor nodes 1008 is enabled by the remaining two factor statements.

In this way the factor graph data structure is formed and may be provided to the inference engine which carries out the machine learning as described above. For example, this may comprise carrying out message passing over the factor graph.

Figure 11:
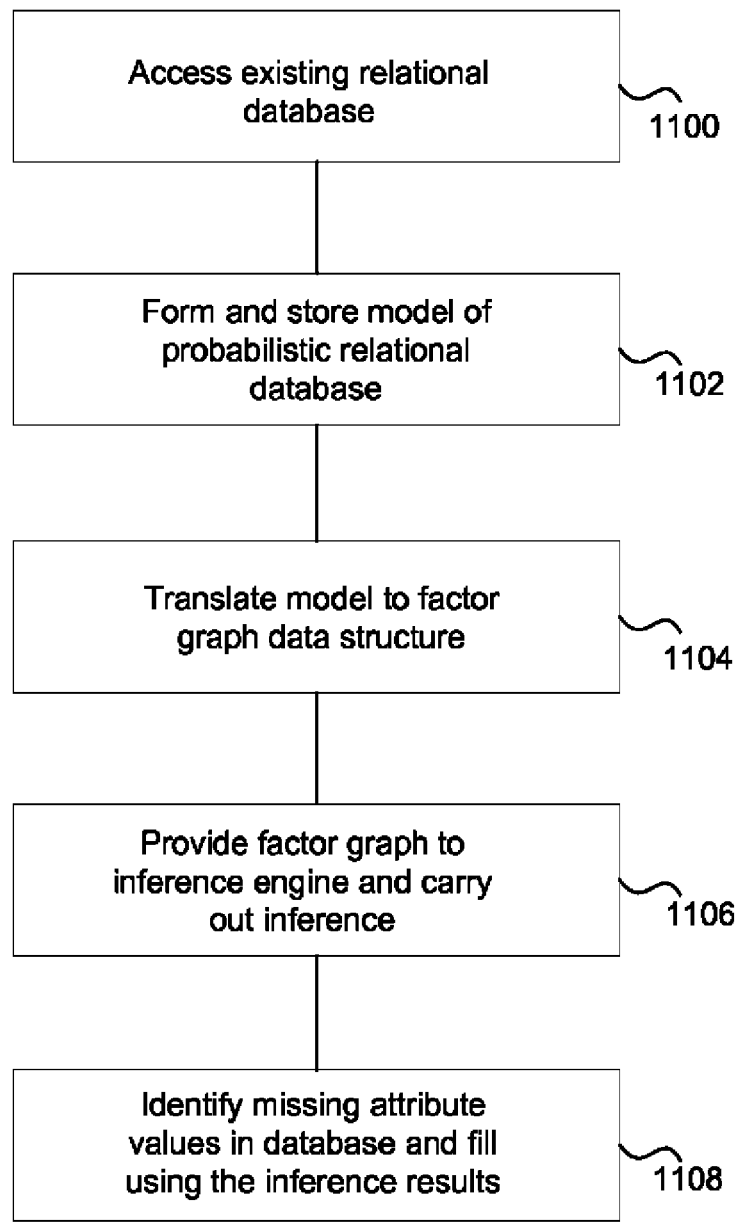
FIG. 11 is a flow diagram of an example method of machine learning using the system of FIG. 1 and filling missing values in the associated database.

FIG. 11 is a flow diagram of a method of using the machine learning system of FIG. 1 to identify and fill missing attribute values in a relational database. An existing relational database is accessed 1100 and a model of a probabilistic relational database is formed and stored. For example, the relational database may comprise medical information about people as in the example of FIGS. 2 to 4 above. The model is translated 1104 to a factor graph data structure and that data structure is provided to an inference engine for machine learning 1106. Missing attribute values are identified in the database. In the medical weights example, some of the people's weights may be missing. The system may be arranged to fill those attribute values using the learnt average weight for the appropriate gender.

Figure 12:
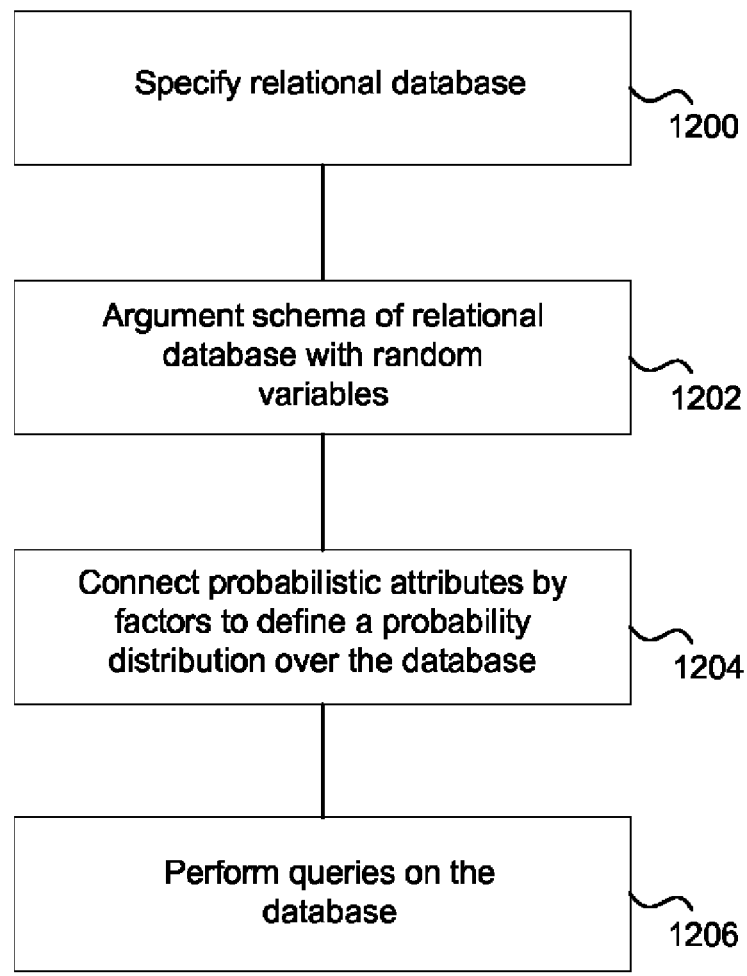
FIG. 12 is a flow diagram of an example method of forming a probabilistic relational database.

FIG. 12 is a flow diagram of a method of forming a model of a probabilistic relational database. An existing, or new relational database is specified 200 and one or more relation schema of that database are augmented with random variables 1202. These random variables represent the probabilistic attributes required in the particular machine learning problem domain. The probabilistic attributes are then connected by factors to define a probability distribution over the database 1204. Queries are then performed on the database using FACTOR statements 1206 to access the data in the appropriate manner required for the machine learning.

Figure 13:
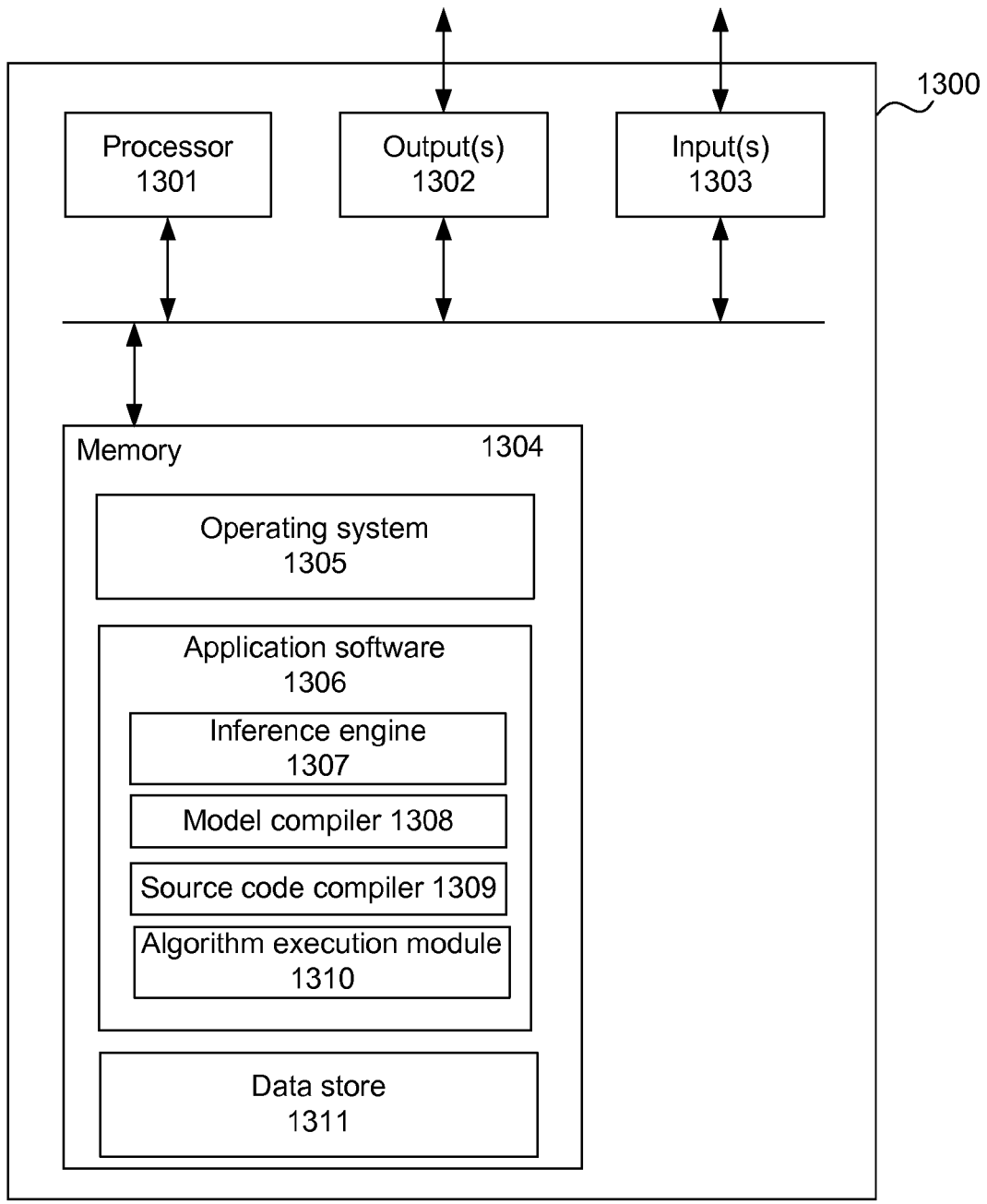
FIG. 13 illustrates an exemplary computing-based device in which embodiments of a machine learning system may be implemented.

FIG. 13 illustrates various components of an exemplary computing-based device 1300 which may be implemented as any form of a computing and/or electronic device, and in which embodiments of a machine learning system may be implemented.

The computing-based device 1300 comprises one or more inputs 1303 which are of any suitable type for receiving media content, Internet Protocol (IP) input, data from relational databases or other input which may be received via a communications network of any type.

Computing-based device 1300 also comprises one or more processors 1301 which may be microprocessors, controllers or any other suitable type of processors for processing computer executable instructions to control the operation of the device in order to carry out machine learning. Platform software comprising an operating system 1305 or any other suitable platform software may be provided at the computing-based device to enable application software 1306 to be executed on the device. The application software may comprise a inference engine 1307 a model compiler 1308 a source code compiler 1309 and an algorithm execution module 1310.

The computer executable instructions may be provided using any computer-readable media, such as memory 1304. The memory is of any suitable type such as random access memory (RAM), a disk storage device of any type such as a magnetic or optical storage device, a hard disk drive, or a CD, DVD or other disc drive. Flash memory, EPROM or EEPROM may also be used. The memory may also comprise a data store 1311 which may comprise a relational database in some examples.

An output 1302 is also provided such as an audio and/or video output to a display system integral with or in communication with the computing-based device. The display system may provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like. Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items. The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A machine learning system comprising:
   an input arranged to access a plurality of relational databases;
   at least one store holding a model of a probabilistic relational database formed from one or more of the plurality of relational databases, the model including one or more relation schemas, each relation schema having a plurality of probabilistic attributes,
   wherein the model includes relational algebra instructions that query data from the one or more of the plurality of relational databases, the relational algebra instructions including:
      one or more factor operations each of which specifies a mapping for the queried data from each relational database to a probability distribution;
      for each relation schema, at least one augmentation clause that adds the plurality of probabilistic attributes to the relation schema; and
      at least one factor clause that specifies how a factor node is to be connected between probabilistic attributes in a factor graph data structure;
   a processor arranged to translate the model into the factor graph data structure using rules stored at a memory; and
   an inference engine arranged to perform an inference according to the factor graph data structure by using the queried data from each relational database and updating values of the plurality of probabilistic attributes for each relation schema.

2. A machine learning system as claimed in claim 1 wherein the at least one store holds the model such that the at least one factor clause is selected from one of: a single relation factor clause, a cross-relation factor clause and a cross entity factor clause.

3. A machine learning system as claimed in claim 2 wherein the at least one factor clause is the single relation factor clause and the single relation factor clause connects the factor node between at least a first probabilistic attribute and at least a second deterministic attribute of a same relation schema.

4. A machine learning system as claimed in claim 2 wherein the at least one factor clause is the cross-relation factor clause and the cross-relation factor clause connects the factor node between probabilistic attributes of different relation schemas.

5. A machine learning system as claimed in claim 2 wherein the at least one factor clause is the cross entity factor clause and the cross entity factor clause connects the factor node between a plurality of probabilistic attributes of a same relation schema.

6. A machine learning system as claimed in claim 1 wherein the processor is further arranged to identify missing deterministic attribute values in the one or more of the plurality of relational databases and to fill the missing deterministic attribute values using results of the inference.

7. A machine learning system as claimed in claim 1 wherein the inference engine is further arranged to perform the inference using message passing applied to the factor graph data structure.

8. A machine learning system as claimed in claim 1 wherein the factor graph data structure comprises a bipartite graph.

9. A machine learning system as claimed in claim 1 wherein the one or more of the plurality of relational databases comprises game player data and game outcome data and wherein at least some of the plurality of probabilistic attributes for each relational schema comprise player skill estimates.

10. A system comprising:
    an input arranged to access one or more relational databases;
    at least one store holding a model of a probabilistic relational database, the model comprising one or more relation schemas each including a plurality of probabilistic attributes,
    wherein the model includes relational algebra instructions that query data from the one or more relational databases, the relational algebra instructions including:
       one or more factor operations each of which specifies a mapping for the queried data from each relational database to a probability distribution;
       for each relation schema, at least one augmentation clause that adds the plurality of probabilistic attributes to the relation schema; and
       at least one factor clause that specifies how a factor node is to be connected between probabilistic attributes in a factor graph data structure; and
    a processor arranged to translate the model into the factor graph data structure using specified semantics stored at a memory.

11. A system as claimed in claim 10 wherein the at least one store holds the model such that the at least one factor clause specifies constraints on a probability distribution over the one or more relational databases.

12. A system as claimed in claim 10 wherein the model of the probabilistic relational database is arranged to facilitate a data mining task for mining data from the one or more relational databases and wherein the results of the inference provide a solution to the data mining task.

13. A computer-implemented method comprising:
accessing one or more relational databases having deterministic data;
storing, in a store by one or more processors, a model of a probabilistic relational database, the model comprising one or more relation schemas,
wherein each relation schema includes a plurality of probabilistic attributes,
wherein the model includes relational algebra instructions that include:
one or more factor operations each of which specifies a mapping for a portion of the deterministic data to a probability distribution;
for each relation schema, at least one augmentation clause adding the plurality of probabilistic attributes to the relation schema; and
at least one factor clause that specifies how the plurality of probabilistic attributes for each relation schema are to be connected in a factor graph data structure; and
accessing values of the plurality of the probabilistic attributes for each relational database according to the model such that the probabilistic relational database is formed.

14. A method as claimed in claim 13 further comprising translating the model into the factor graph data structure using rules stored at a memory.

15. A method as claimed in claim 14 further comprising:
providing the factor graph data structure to an inference engine;
performing an inference based on the factor graph data structure using data in the probabilistic relational database; and
storing results of the inference at the plurality of probabilistic attributes.

16. A method as claimed in claim 15 further comprising:
identifying missing deterministic attribute values in the one or more relational databases; and
filling the missing deterministic attribute values using the results of the inference.

\* \* \* \* \*